(12) United States Patent
Joshi (10) Patent No.: US 8,972,093 B2
(45) Date of Patent: Mar. 3, 2015

(54) LANE-BASED LOCALIZATION

(71) Applicant: Toyota Motor Engineering & Manufacturing North America, Inc, Erlanger, KY (US)

(72) Inventor: Avdhut S. Joshi, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 67 days.

(21) Appl. No.: 13/858,410

(22) Filed: Apr. 8, 2013

(65) Prior Publication Data

US 2014/0303828 A1 Oct. 9, 2014

(51) Int. Cl.
G08G 1/16 (2006.01)
G06K 9/36 (2006.01)

(52) U.S. Cl.
USPC .............................. 701/23; 701/300; 382/104

(58) Field of Classification Search
USPC .................... 701/23, 300, 117; 340/904, 905; 382/104, 168; 348/148, 169
See application file for complete search history.

(56) References Cited

U.S. PATENT DOCUMENTS

| | | | |
|---|---|---|---|
| 2001/0056326 A1* | 12/2001 | Kimura | 701/208 |
| 2006/0015252 A1* | 1/2006 | Yamamoto et al. | 701/301 |
| 2007/0276599 A1* | 11/2007 | Ogawa | 701/300 |
| 2008/0033645 A1* | 2/2008 | Levinson et al. | 701/213 |
| 2008/0040039 A1* | 2/2008 | Takagi | 701/300 |
| 2010/0076684 A1* | 3/2010 | Schiffmann et al. | 701/301 |
| 2010/0114416 A1 | 5/2010 | Au et al. | |
| 2010/0191461 A1* | 7/2010 | Zeng | 701/208 |
| 2010/0217529 A1 | 8/2010 | Stroila et al. | |
| 2014/0088855 A1* | 3/2014 | Ferguson | 701/117 |

OTHER PUBLICATIONS

Aly, "Real time Detection of Lane Markers in Urban Streets", California Institute of Technology, Pasadena, CA, undated, 6 pages.
Montemerlo et al, "Junior: The Stanford Entry in the Urban Challenge", Palo Alto, CA, undated in 31 pages.
Hung, "Lane Estimation for Autonomous Vehicles using Vision and LIDAR", Massachusetts Institute of Technology, Feb. 2010, 114 pages.

(Continued)

*Primary Examiner* — Tan Q Nguyen
(74) *Attorney, Agent, or Firm* — Christopher G. Darrow; Young Basile Hanton & MacFarlane P.C.

(57) ABSTRACT

A system, device, and methods for autonomous navigation using lane-based localization. Once example computer-implemented method includes receiving, from one or more sensors disposed on a vehicle, data representing a road surface proximate to the vehicle and removing the data falling below an adaptive threshold from the data representing the road surface to isolate data representing boundaries on the road surface. The method further includes generating detected lanes based on the data representing boundaries on the road surface by applying one or more filters, generating expected lanes proximate to the vehicle using data included in a route network definition file, comparing the detected lanes to the expected lanes, and generating a localized vehicle position based on the comparison between the detected lanes and the expected lanes.

20 Claims, 4 Drawing Sheets

(56) References Cited

OTHER PUBLICATIONS

Levinson, et al., "Map-Based Precision Vehicle Localization in Urban Environments", Stanford Artificial Intelligence Laboratory, Proceedings of Robotics: Science and Systems, Jun. 2007, Atlanta, GA, USA in 8 pages.

Levinson, et al. "Robust Vehicle Localization in Urban Environments Using Probabilistic Maps", 2010 IEEE International Conference on Robotics and Automation, Anchorage Convention District, May 3-8, 2010, pp. 4372-4378, Anchorage, Alaska, USA.

Rojo et al., "Spirit of Berlin: An Autonomous Car for the DARPA Urban Challenge Hardware and Software Architecture", Team Berlin, Jun. 1, 2007 in 25 pages.

Co-pending U.S. Appl. No. 13/850,935 to Inventor Michael J. Delp filed Mar. 26, 2013.

\* cited by examiner

LANE-BASED LOCALIZATION

BACKGROUND

Autonomous navigation of a vehicle requires certainty in the position of the vehicle with a sufficient degree of accuracy. Calculating a precise physical position for the vehicle in respect to a representation of its surroundings can be referred to as localization. Localization can be performed for autonomous vehicles by comparing a representation of the current position of the vehicle in respect to a road or other geographic features to a representation of the same road or features recorded on a detailed virtual map.

SUMMARY

A system, device, and methods for lane-based localization.

In one implementation, an autonomous navigation system using lane-based localization is disclosed. The system includes one or more sensors disposed on a vehicle; and a computing device in communication with the one or more sensors. The computing device includes one or more processors for controlling the operations of the computing device and a memory for storing data and program instructions used by the one or more processors. The one or more processors are configured to execute instructions stored in the memory to: receive, from the one or more sensors, data representing a road surface proximate to the vehicle; remove the data falling below an adaptive threshold from the data representing the road surface to isolate data representing boundaries on the road surface; generate detected lanes based on the data representing boundaries on the road surface by applying one or more filters; generate expected lanes proximate to the vehicle using data included in a route network definition file; compare the detected lanes to the expected lanes; and generate a localized vehicle position based on the comparison between the detected lanes and the expected lanes.

In another implementation, a computer-implemented method for autonomous navigation using lane-based localization is disclosed. The method includes receiving, from one or more sensors disposed on a vehicle, data representing a road surface proximate to the vehicle and removing the data falling below an adaptive threshold from the data representing the road surface to isolate data representing boundaries on the road surface. The method further includes generating detected lanes based on the data representing boundaries on the road surface by applying one or more filters, generating expected lanes proximate to the vehicle using data included in a route network definition file, comparing the detected lanes to the expected lanes, and generating a localized vehicle position based on the comparison between the detected lanes and the expected lanes.

In another implementation, a computing device is disclosed. The computing device includes one or more processors for controlling the operations of the computing device and a memory for storing data and program instructions used by the one or more processors. The one or more processors are configured to execute instructions stored in the memory to receive, from one or more sensors disposed on a vehicle, data representing a road surface proximate to the vehicle; remove the data falling below an adaptive threshold from the data representing the road surface to isolate data representing boundaries on the road surface; generate detected lanes based on the data representing boundaries on the road surface by applying one or more filters; generate expected lanes proximate to the vehicle using data included in a route network definition file; compare the detected lanes to the expected lanes; and generate a localized vehicle position based on the comparison between the detected lanes and the expected lanes.

BRIEF DESCRIPTION OF THE DRAWINGS

The description makes reference to the accompanying drawings wherein like reference numerals refer to like parts throughout the several views, and wherein.

DETAILED DESCRIPTION

An autonomous navigation system using lane-based localization and methods for implementing the system are described below. The system can include a computing device in communication with one or more sensors disposed on a vehicle. In a method of using the system, at least one sensor can receive data representing a road surface proximate to the vehicle. The computing device can include a processor configured to remove the data falling below an adaptive threshold from the data representing the road surface to isolate data representing boundaries on the road surface. The processor can be further configured to generate detected lanes by applying one or more filters to the isolated boundaries of the road surface and generate expected lanes using data included in a route network definition file. Finally, the processor can be configured to compare the detected lanes to the expected lanes to generate a localized vehicle position based on the comparison.

Figure 1:
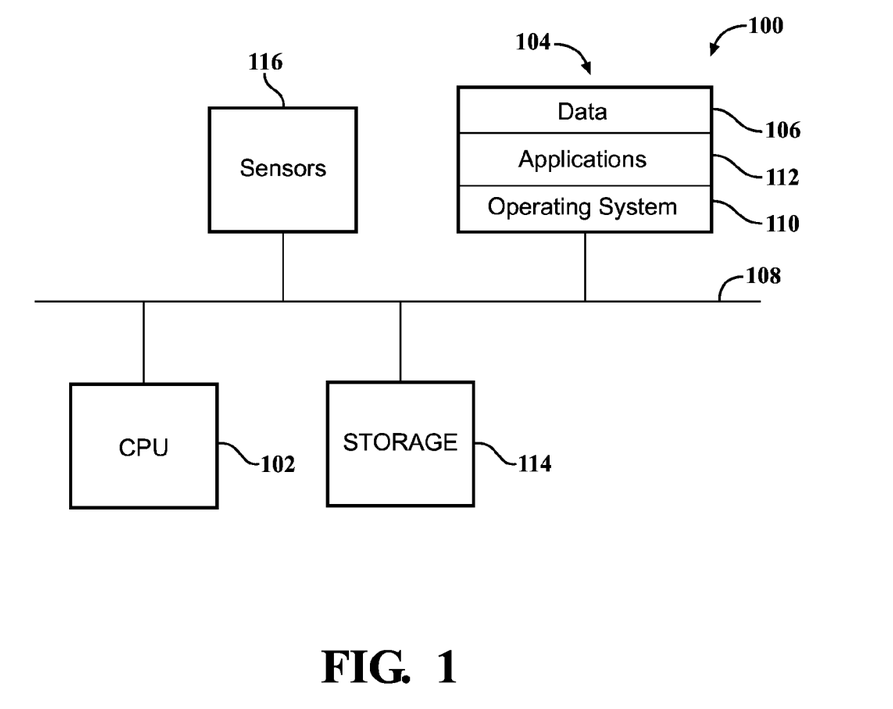
FIG. 1 is a block diagram of a computing device.

FIG. 1 is a block diagram of a computing device 100. The computing device 100 can be any type of vehicle-installed, handheld, desktop, or other form of single computing device, or can be composed of multiple computing devices. The CPU 102 in the computing device 100 can be a conventional central processing unit or any other type of device, or multiple devices, capable of manipulating or processing information. The memory 104 in the computing device 100 can be a random access memory device (RAM) or any other suitable type of storage device. The memory 104 can include data 106 that is accessed by the CPU 102 using a bus 108. The memory 104 can also include an operating system 110 and installed applications 112, the installed applications 112 including programs that permit the CPU 102 to perform the lane-based localization methods described here.

The computing device 100 can also include additional storage 114, for example, a memory card, flash drive, or any other form of computer readable medium. The installed applications 112 can be stored in whole or in part in the secondary storage 114 and loaded into the memory 104 as needed for processing. The computing device 100 can also include, or be coupled to, one or more sensors 116. The sensors 116 can capture data for processing by an inertial measurement unit (IMU), an odometry system, a global positioning system (GPS), a light detection and ranging (LIDAR) system, or any other type of system capable of capturing vehicle and/or positional data and outputting signals to the CPU 102.

If the sensors 116 capture data for an IMU, changes in x, y, and z acceleration and rotational acceleration for the vehicle can be captured. If the sensors 116 capture data for an odometry system, data relating to wheel revolution speeds and steering angle can be captured. If the sensors 116 capture data for a GPS, a receiver can obtain vehicle position estimates in global coordinates based on data from one or more satellites. If the sensors 116 capture data for a LIDAR system, data relating to intensity or reflectivity returns of the area surrounding the vehicle can be captured. In the examples described below, the sensors 116 can capture, at least, data for a GPS and a LIDAR system in order to improve positional accuracy of an autonomous vehicle.

Figure 2:
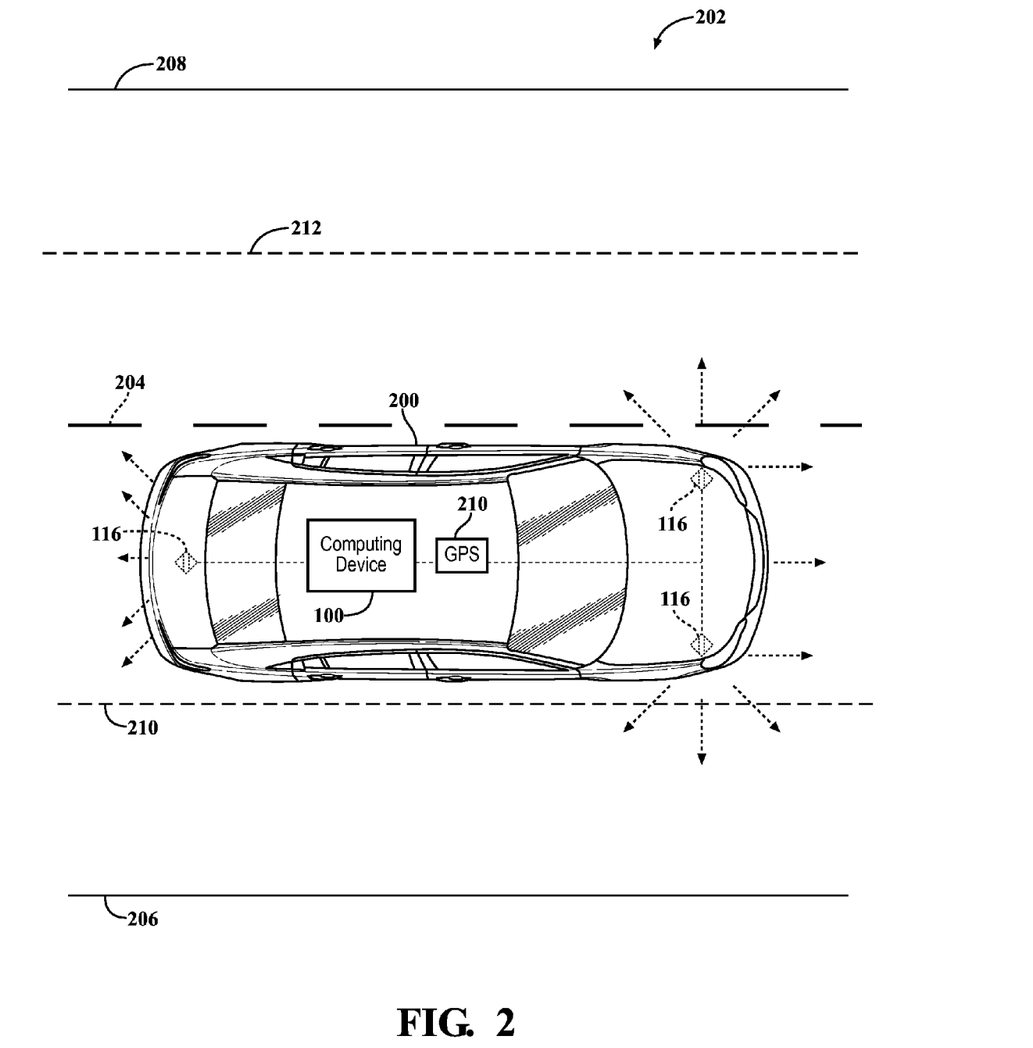
FIG. 2 shows a schematic of a vehicle including the computing device of FIG. 1.

FIG. 2 shows a schematic of a vehicle 200 including the computing device 100 of FIG. 1. The vehicle 200 is traversing a route along a road 202. The road 202 includes a dotted center line 204 as well as road edges 206, 208. The road can also include several lanes on each side of the dotted center line 204. In this example, two lower lanes are identified by the dotted center line 204, a lane line 210, and the road edge 206. Two upper lanes are identified by the dotted center line 204, a lane line 212, and the road edge 208. Hence, a total of 4 lanes are present on the example road 202 shown here, though the vehicle 200 may experience portions of the route with any possible number of lanes.

The computing device 100 of FIG. 1 can be located within the vehicle 200 as shown in FIG. 2 or can be located remotely from the vehicle 200. If the computing device 100 is remote from the vehicle, the vehicle 200 can include the capability of communicating with the computing device 100. The vehicle 200 can also include a GPS 210 capable of measuring vehicle position in global coordinates based on data from one or more satellites. The GPS 210 can send data related to vehicle position to the computing device 100.

The vehicle 200 can also include a plurality of sensors 116. In one example autonomous navigation system, the sensors 116 can be located around the perimeter of the vehicle as shown in FIG. 2. Each sensor 116 can capture data that can be processed using a LIDAR system. The LIDAR system can include an application 112 stored in the computing device 100 or a separate system or application in communication with the computing device 100. When in communication with a LIDAR system, the sensors 116 can capture and send data related to the laser returns from physical objects in the area surrounding the vehicle 200, for example, the laser returns from the center line 204, lane lines 210, 212, and road edges 206, 208 as the vehicle 200 travels along the road 202. Laser returns can include the backscattered light reflected by objects hit by a source of light, e.g. laser light, being emitted by the sensors 116 present on the vehicle 200. The light can also be emitted by another source on the vehicle 200. Once the light is reflected by the surrounding objects, the sensors 116 can capture intensity values, a reflectivity measure that indicates the brightness of the laser returns.

Figure 3:
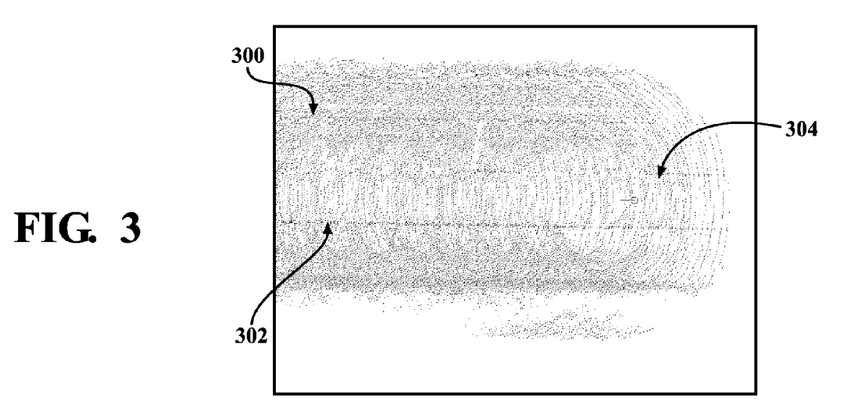
FIG. 3 shows an example two-dimensional representation of data representing a road surface proximate to the vehicle of FIG. 2.

FIG. 3 shows an example two-dimensional representation of data representing a road surface proximate to the vehicle 200 of FIG. 2. In this example, the data are a set of intensity values captured within a predetermined distance from the vehicle 200 as the vehicle 200 traverses a portion of a route. For example, the group of intensity values can include data accumulated over the last 40 meters of travel by the vehicle 200, with the distance being selected for compliance with the capability of the sensors 116 as well as the amount of data needed for subsequent matching to a portion of a lane-based map. The distance can be 40 meters or any other distance that allows efficient comparison. The data can also be processed to remove any intensity values that represent obstacles, such as other vehicles, people, or animals that would not normally be present along the route. In the example shown in FIG. 3, various obstacles have already been removed from the data representing the road surface.

As can be seen in FIG. 3, collecting data consisting of intensity values that include all laser returns from the area surrounding the vehicle 200 can lead to a cluttered two-dimensional representation of the route that the vehicle 200 is currently traversing without sufficient distinction between the intensity values. For example, intensity values representing the lane edges 300, 302, the dotted center line 304, and the pavement or surrounding grass, gravel, or foliage is can all be relatively close to each other and perceived as indistinct due to various conditions, e.g. sunlight, darkness, pavement color, etc. In addition, intensity values can be collected over multiple runs using multiple scans in order to generate a more complete capture of the surrounding environment.

Figure 4:
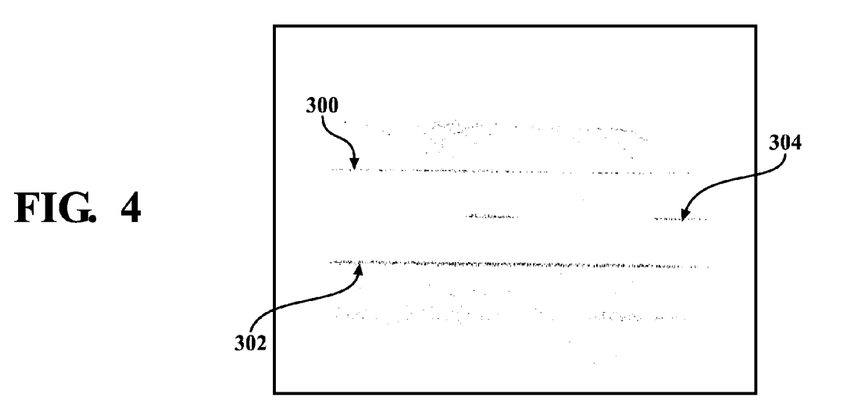
FIG. 4 shows an example two-dimensional representation of data representing lane boundaries based on the data representing the road surface from FIG. 3.

FIG. 4 shows an example two-dimensional representation of data representing lane boundaries based on the data representing the road surface from FIG. 3. In order to separate lane boundaries, e.g. the lane edges 300, 302 and the dotted center line 304, from other objects such as gravel and pavement, a histogram can be generated from the intensity values collected and represented in FIG. 3. The histogram can be integrated to define an intensity value below which a fixed percentage of the intensity values collected fall, e.g., an adaptive threshold. In the example shown here, the intensity values below an adaptive threshold of 95% have been removed from the data shown in FIG. 3 to create the example two-dimensional representation of lane boundaries shown in FIG. 4.

By establishing a threshold in general, the background intensity values, which represent such objects as gravel and pavement, can be removed from the rest of the intensity values, leaving only the brightest intensity values representing desirable geographic features such as the lane edges 300, 302, curbs, dotted center line 304, street signs, edges of the road, etc. Using an adaptive threshold is an improvement over using a fixed threshold, such as a fixed intensity value. This is because a fixed threshold does not account for different conditions, such as different lighting when the intensity values are collected, different road surfaces present along the route the vehicle 200 is traversing, or different sensors 116 being used on different vehicles. The adaptive threshold can account for these various conditions experienced while the vehicle 200 traverses the route. The two-dimensional representation of the route in FIG. 4 includes many of the same features as FIG. 3, such as the lane edges 300, 302 and the dotted center line 304, while the intensity values that represent the pavement and a portion of the surrounding foliage have been removed.

Figure 5:
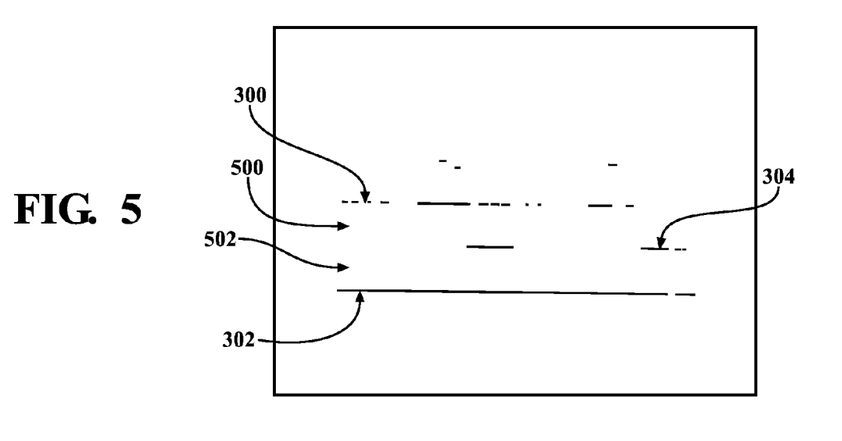
FIG. 5 shows an example two-dimensional representation of detected lanes based on filtering the data representing lane boundaries from FIG. 4.

FIG. 5 shows an example two-dimensional representation of detected lanes 500, 502 based on filtering the data representing lane boundaries from FIG. 4. The boundaries of the detected lanes 500, 502 in this example are the lane edges 300, 302 and the dotted center line 304. Several different filters can be applied to the data representing lane boundaries as shown in FIG. 4 to extract the detected lanes 500, 502 shown in FIG. 5. In the longitudinal direction of travel, a difference filter can be applied to extract lane boundaries from the image. In the lateral direction, a Gaussian smoothing filter can be applied to extract lane boundaries from the image. The filters can be constructed using the following convolution functions:

$$f(x) = \frac{1}{\sigma_x^2}\exp\left(-\frac{x^2}{2\sigma_x^2}\right)\left(1 - \frac{x^2}{\sigma_x^2}\right)$$

$$f(y) = \frac{1}{\sigma_y^2}\exp\left(-\frac{y^2}{2\sigma_y^2}\right)$$

The two-dimensional representation of detected lanes 500, 502 can also be processed using connected component analysis. The connected component analysis can include a Ransac-based cubic spline fitting using points from each of the extracted components. The entire lane curve can then be defined using four spline control points. The detected lanes 500, 502 can also be analyzed in order to include additional information including lane type, e.g. solid or dashed, and lane position, e.g. left or right. In the example shown in FIG. 5, there are two detected lanes 500, 502. The first detected lane 500 extends between lane edge 300 and lane centerline 304. The second detected lane 502 extends between lane centerline 304 and lane edge 302. The detected lanes 500, 502 at a given location surrounding the vehicle 200 can now be compared to expected lanes for the same location.

Figure 6:
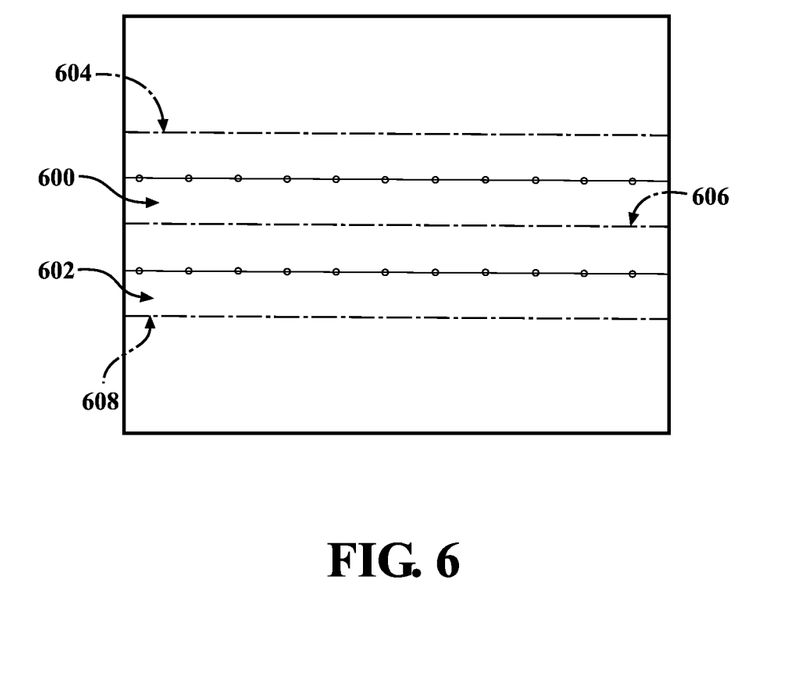
FIG. 6 shows an example two-dimensional representation of expected lanes on the example road surface of FIG. 3 based on route network definition file information.

FIG. 6 shows an example two-dimensional representation of expected lanes 600, 602 on the example road surface of FIG. 3 based on a route network definition file. The route network definition file can include data regarding multiple road segments, the position of lanes on the road segments, the expected width of a given lane at a given location for each of the road segments, the relationship between lanes at a given location for each of the road segments, and other relevant information pertaining to establishing lane boundaries. The sub-portion of the route network definition file used to generate expected lanes 600, 602 for comparison to detected lanes 500, 502 proximate to the vehicle 200 can be selected based on the estimated position of the vehicle 200 in global coordinates as supplied by the GPS 210 of the vehicle 200.

In the example shown in FIGS. 3-6, there are two detected lanes 500, 502 generated using laser returns collected proximate to the vehicle 200 and two expected lanes 600, 602 generated using the sub-portion of the route definition file identified based on the GPS 201 calculated location of the vehicle 200. The first expected lane 600 shown in FIG. 6 extends between a lane edge 604 and a lane centerline 606. The second expected lane 602 in FIG. 6 extends between the lane centerline 606 and another lane edge 608. Once the expected lanes 600, 602 are generated based on the estimated position of the vehicle 200, the expected lanes 600, 602 can be compared to the detected lanes 500, 502 to accurately localize the vehicle 200.

Figure 7:
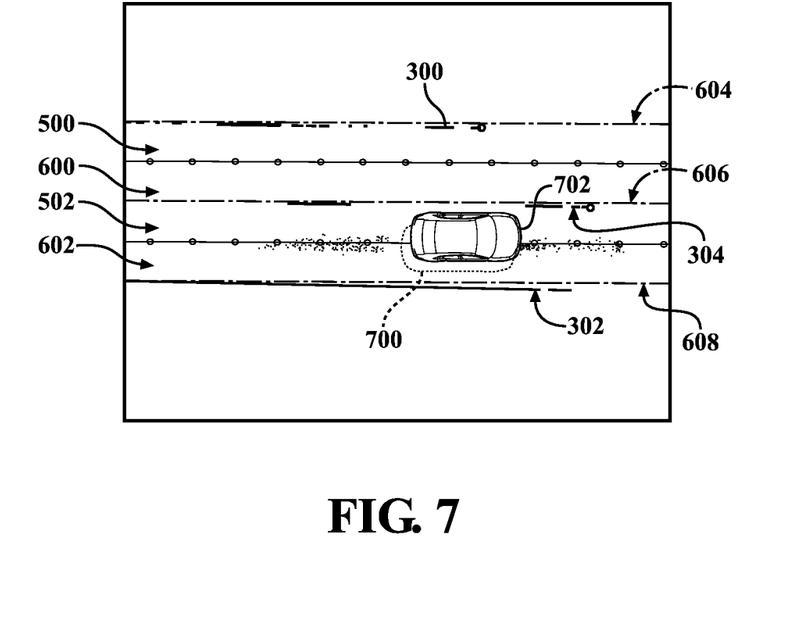
FIG. 7 shows an example schematic of generating a localized vehicle position based on the comparison between the detected lanes of FIG. 5 and the expected lanes of FIG. 6.

FIG. 7 shows an example schematic of generating a localized vehicle position based on the comparison between the detected lanes 500, 502 of FIG. 5 and the expected lanes 600, 602 of FIG. 6. As described above, the expected lanes 600, 602 can be generated based on the estimated position of the vehicle in global coordinates and the route network definition file information corresponding to that estimated position. In FIG. 7, the estimated vehicle position based on global coordinates is shown using vehicle 700. The vehicle position can then be localized using a particle-based localization strategy.

In the example particle-based localization strategy applied in FIG. 7, the initial pose of the vehicle is represented by a set of weighted particles, with the weighted mean of the particles taken as the most likely position of the vehicle. Each particle can then be reweighted using a measurement update function to extract the lanes that a sensor would observe given the position of each particle. The particles in this example are reweighted according to the following equation:

$$w = \Sigma_n^{Lanes} N(d_n^m = d_n^o, \sigma_o)$$

$d_n^m$=Expected Lane Distance from Map
$d_n^o$=Detected Lane Distance
N=Normal Distribution
σ=Variance of the Distribution Once the particles are reweighted, the localized vehicle position based on the extracted lanes 600, 602 can be shown using vehicle 702. Vehicle 702 is some distance above the vehicle 700, indicating that the global coordinate position, as shown by vehicle 700, does not adequately represent the lane-based localized position, as shown by vehicle 702. In other words, the localized position, shown by vehicle 702, is more accurate than the global-coordinate-based position, shown by vehicle 700.

One example method for lane-based localization using the system described in FIGS. 1-7 above includes receiving, from one or more sensors 116 disposed on a vehicle 200, data representing a road surface proximate to the vehicle. As described above, the sensors 116 can capture data for processing by an inertial measurement unit (IMU), an odometry system, a GPS 210, a LIDAR system, or any other type of system capable of capturing vehicle and/or positional data. The method can further include removing the data falling below an adaptive threshold from the data representing the road surface to isolate data representing boundaries on the road surface. The isolation of the boundaries from other road surface data is shown by comparing the boundaries, e.g. the lane edges 300, 302 and lane centerline 304, in FIGS. 3 and 4.

The example method further includes generating detected lanes, e.g. the detected lanes 500, 502 shown in FIG. 5, based on the data representing boundaries on the road surface by applying one or more filters. As described above, the filters can include difference filters in the longitudinal direction, Gaussian smoothing filters in the lateral direction, or any other type of applicable filter for generating the detected lanes 500, 502. The method can further include generating expected lanes, e.g. the expected lanes 600, 602 shown in FIG. 6, proximate to the vehicle using data included in a route network definition file. As described above, the information in the route network definition file used to generate the expected lanes can be selected based on the estimated position of the vehicle in global coordinates.

The example method further includes comparing the detected lanes 500, 502 to the expected lanes 600, 602 and generating a localized vehicle position based on the comparison between the detected lanes 500, 502 and the expected lanes 600, 602. As described above, the pose of the vehicle is represented by weighted particles that are reweighted using a measurement update function including a comparison of the detected lanes 500, 502 and the expected lanes 600, 602.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An autonomous navigation system using lane-based localization, comprising:
   one or more sensors disposed on a vehicle; and
   a computing device in communication with the one or more sensors, comprising:
      one or more processors for controlling the operations of the computing device; and
      a memory for storing data and program instructions used by the one or more processors, wherein the one or more processors are configured to execute instructions stored in the memory to:
         receive, from the one or more sensors, data representing a road surface proximate to the vehicle;
         remove the data falling below an adaptive threshold from the data representing the road surface to isolate data representing boundaries on the road surface;
         generate detected lanes based on the data representing boundaries on the road surface by applying one or more filters;
         generate expected lanes proximate to the vehicle using data included in a route network definition file;
         compare the detected lanes to the expected lanes; and
         generate a localized vehicle position based on the comparison between the detected lanes and the expected lanes.

2. The system of claim 1 wherein the data representing the road surface includes a plurality of intensity values collected while the vehicle traverses a route.

3. The system of claim 2 wherein the adaptive threshold is the intensity value below which a fixed percentage of the plurality of intensity values fall.

4. The system of claim 1 wherein the one or more filters include a difference filter for detecting lane boundaries.

5. The system of claim 1 wherein the one or more filters include a Gaussian smoothing filter.

6. The system of claim 1 wherein generating the detected lanes includes performing a connected component analysis on the filtered data representing boundaries on the road surface.

7. The system of claim 1 wherein the route network definition file includes geo-positional information for the road surface and width of the expected lanes on the road surface and a positional relationship between the expected lanes on the road surface.

8. The system of claim 1 wherein the localized vehicle position is based on reweighting particles representing the pose of the vehicle.

9. A computer-implemented method for autonomous navigation using lane-based localization, comprising:
   receiving, from one or more sensors disposed on a vehicle, data representing a road surface proximate to the vehicle;
   removing the data falling below an adaptive threshold from the data representing the road surface to isolate data representing boundaries on the road surface;
   generating detected lanes based on the data representing boundaries on the road surface by applying one or more filters;
   generating expected lanes proximate to the vehicle using data included in a route network definition file;
   comparing the detected lanes to the expected lanes; and
   generating a localized vehicle position based on the comparison between the detected lanes and the expected lanes.

10. The method of claim 9 wherein the data representing the road surface includes a plurality of intensity values collected while the vehicle traverses a route.

11. The system of claim 10 wherein the adaptive threshold is the intensity value below which a fixed percentage of the plurality of intensity values fall.

12. The method of claim 9 wherein the one or more filters include a difference filter for detecting lane boundaries.

13. The method of claim 9 wherein the one or more filters include a Gaussian smoothing filter.

14. The method of claim 9 wherein generating the detected lanes includes performing a connected component analysis on the filtered data representing boundaries on the road surface.

15. The method of claim 9 wherein the route network definition file includes geo-positional information for the road surface and width of the expected lanes on the road surface and a positional relationship between the expected lanes on the road surface.

16. The method of claim 9 wherein the localized vehicle position is based on reweighting particles representing the pose of the vehicle.

17. A computing device, comprising:
   one or more processors for controlling the operations of the computing device; and
   a memory for storing data and program instructions used by the one or more processors, wherein the one or more processors are configured to execute instructions stored in the memory to:
      receive, from one or more sensors disposed on a vehicle, data representing a road surface proximate to the vehicle;
      remove the data falling below an adaptive threshold from the data representing the road surface to isolate data representing boundaries on the road surface;
      generate detected lanes based on the data representing boundaries on the road surface by applying one or more filters;
      generate expected lanes proximate to the vehicle using data included in a route network definition file;
      compare the detected lanes to the expected lanes; and
      generate a localized vehicle position based on the comparison between the detected lanes and the expected lanes.

18. The computing device of claim 17 wherein the one or more filters include a difference filter for detecting lane boundaries and a Gaussian smoothing filter.

19. The computing device of claim 17 wherein the route network definition file includes geo-positional information for the road surface and width of the expected lanes on the road surface and a positional relationship between the expected lanes on the road surface.

20. The computing device of claim 17 wherein the localized vehicle position is based on reweighting particles representing the pose of the vehicle.

* * * * *

UNITED STATES PATENT AND TRADEMARK OFFICE
CERTIFICATE OF CORRECTION

| | | |
|---|---|---|
| PATENT NO. | : 8,972,093 B2 | Page 1 of 1 |
| APPLICATION NO. | : 13/858410 | |
| DATED | : March 3, 2015 | |
| INVENTOR(S) | : Avdhut S. Joshi | |

It is certified that error appears in the above-identified patent and that said Letters Patent is hereby corrected as shown below:

Title page, Abstract: item 57 in Line No. 2, please delete "Once" and add --One--.

In the Specification
In Column 1, Line No. 20, please delete ";".
In Column 4, Line No. 5, please delete bolding from "40".
In Column 4, Line No. 19, please delete "is".
In Column 5, Line No. 46, please delete "201" and add --210--.

Signed and Sealed this
Twenty-first Day of July, 2015

Michelle K. Lee
*Director of the United States Patent and Trademark Office*